May 9, 1933. O. N. TEVANDER 1,907,900
CONVEYING MECHANISM
Original Filed June 25, 1928 6 Sheets-Sheet 1
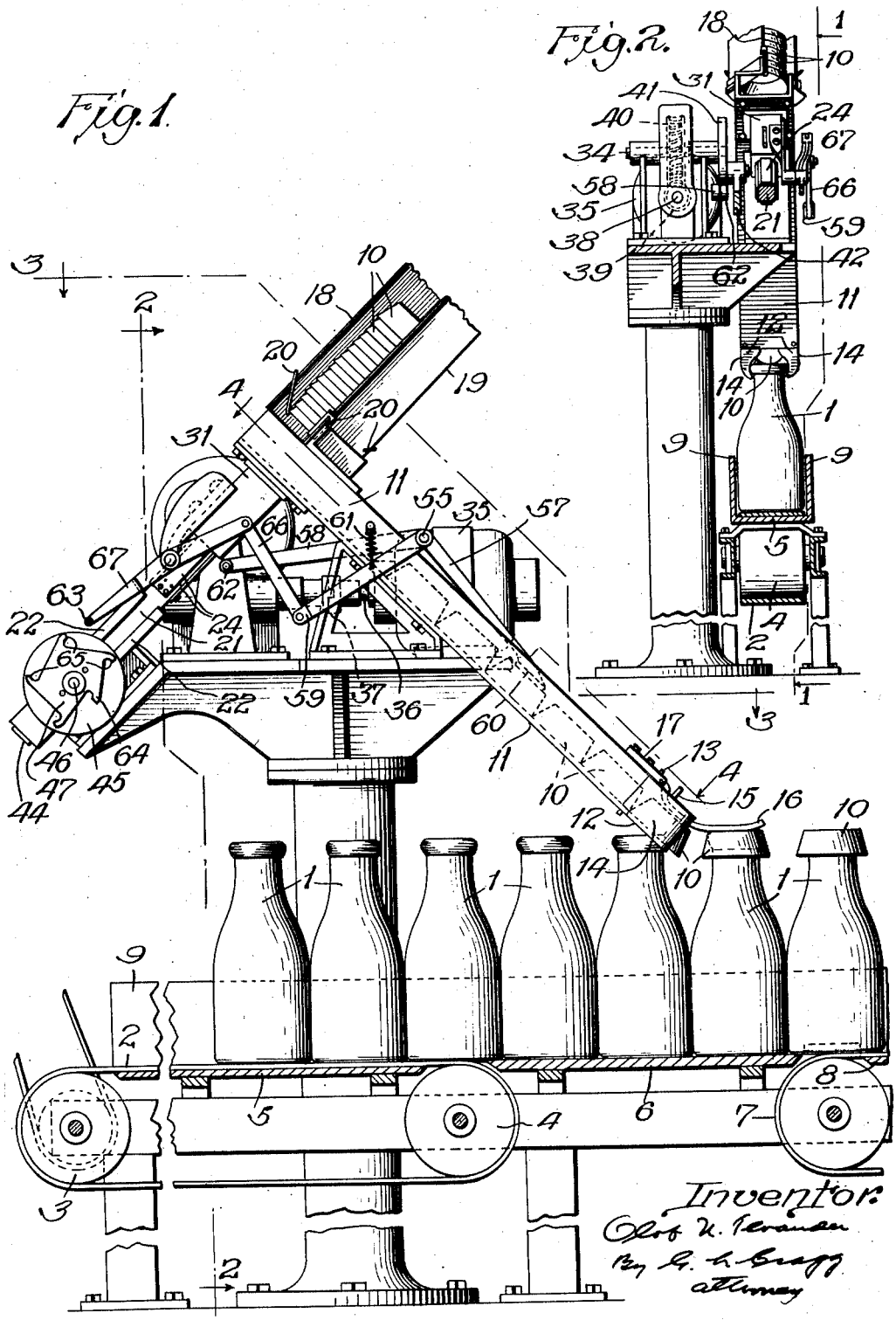

May 9, 1933.  O. N. TEVANDER  1,907,900
CONVEYING MECHANISM
Original Filed June 25, 1928   6 Sheets-Sheet 2
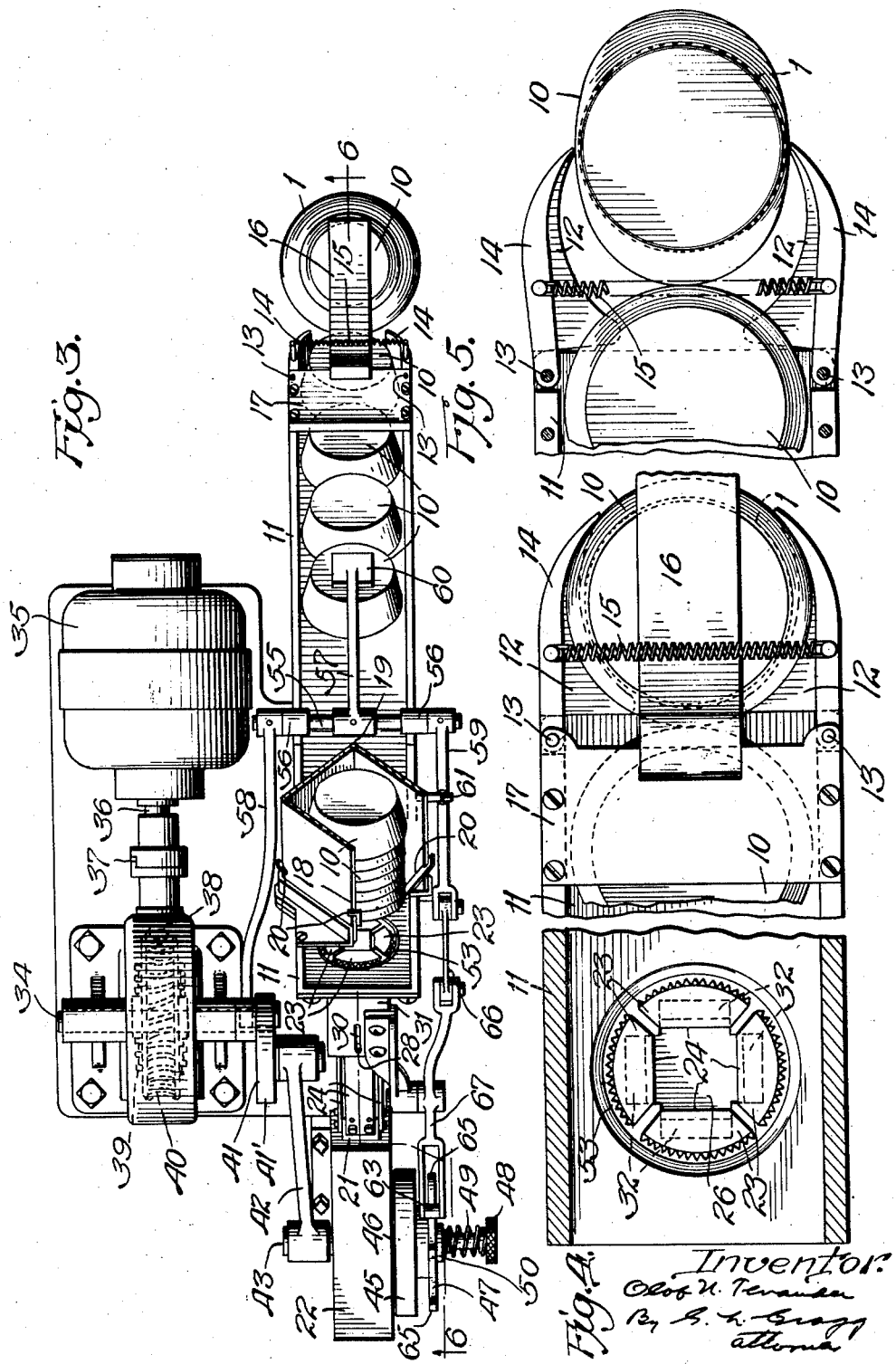

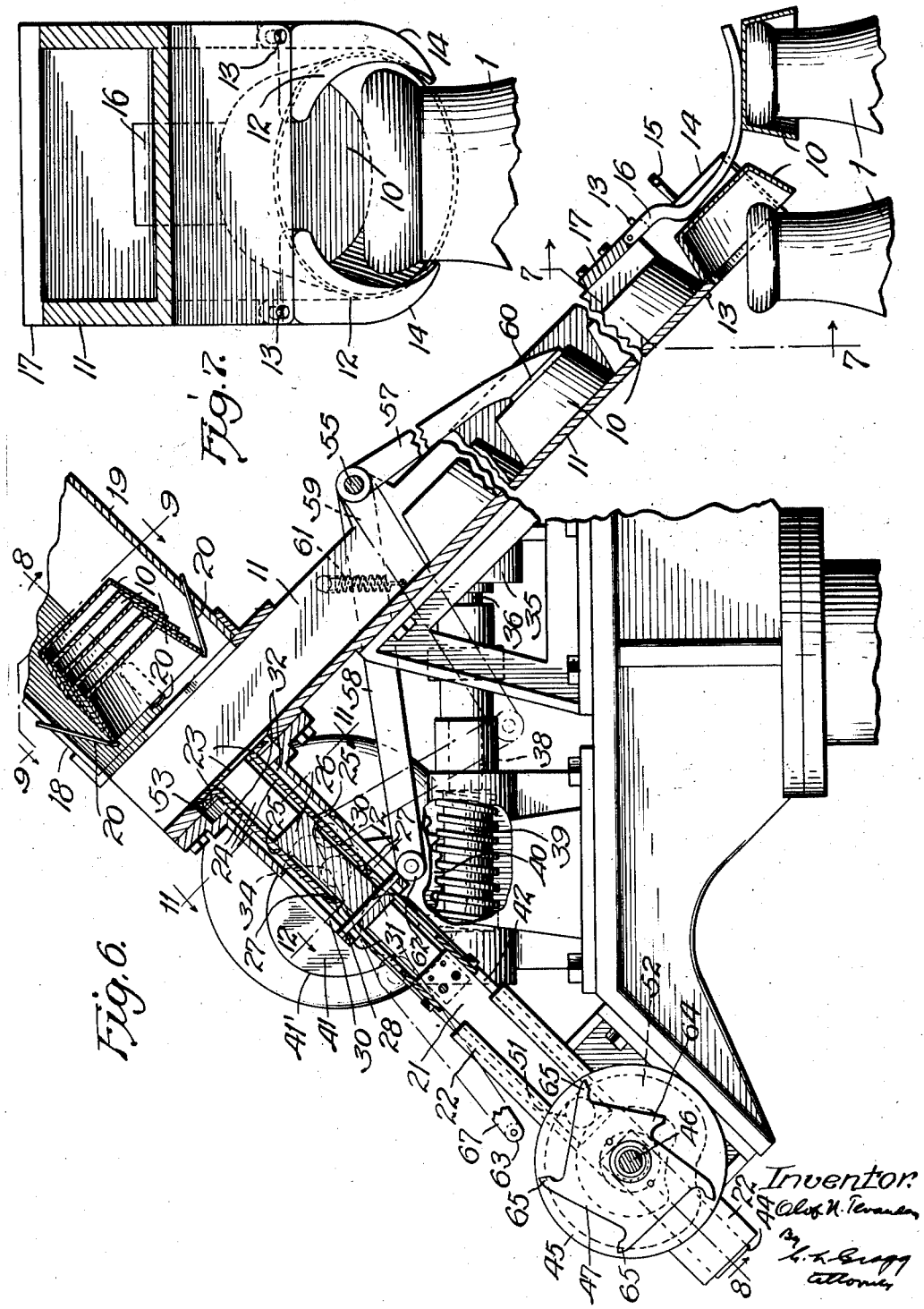

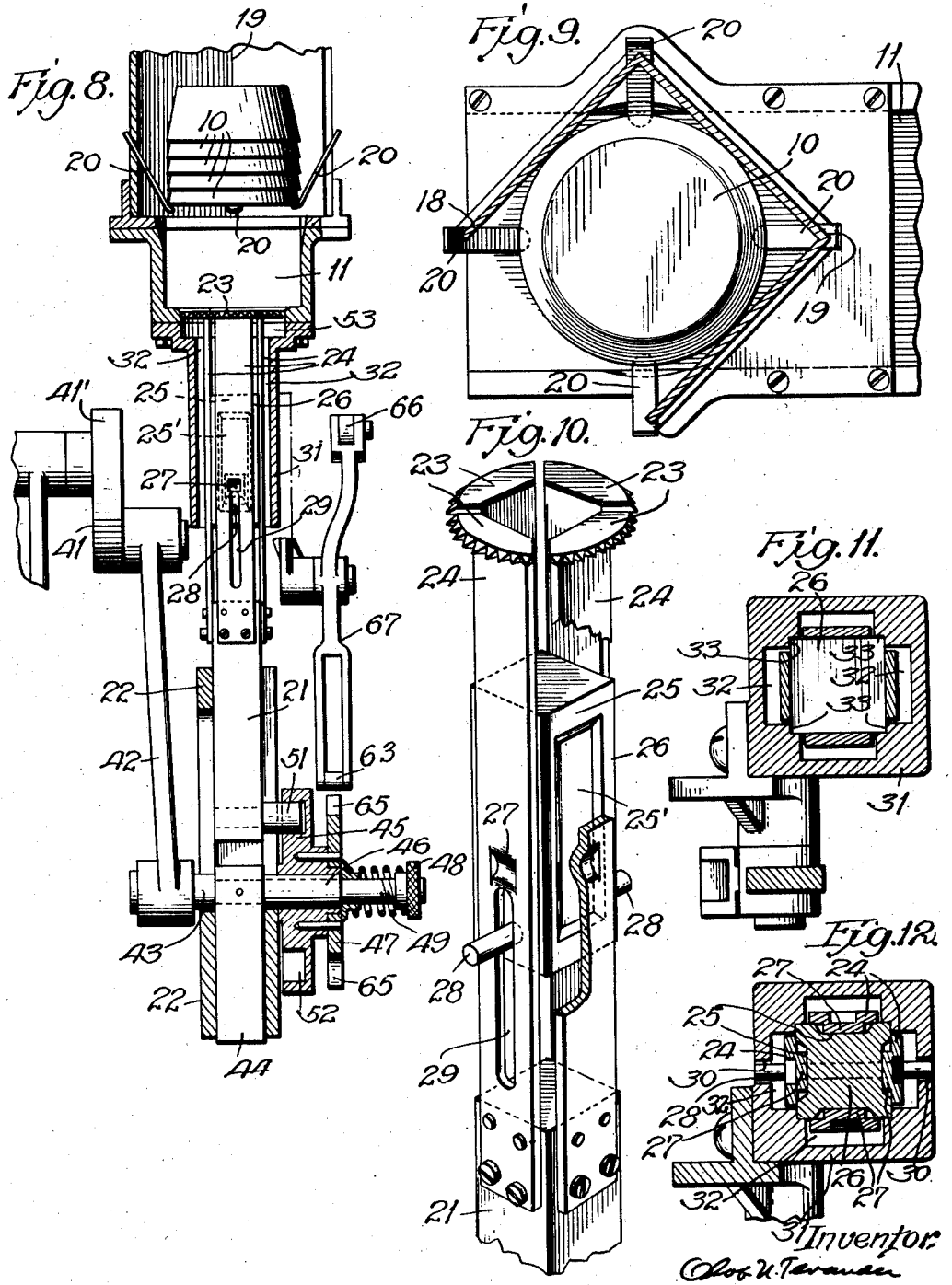

May 9, 1933.  O. N. TEVANDER  1,907,900
CONVEYING MECHANISM
Original Filed June 25, 1928   6 Sheets-Sheet 5
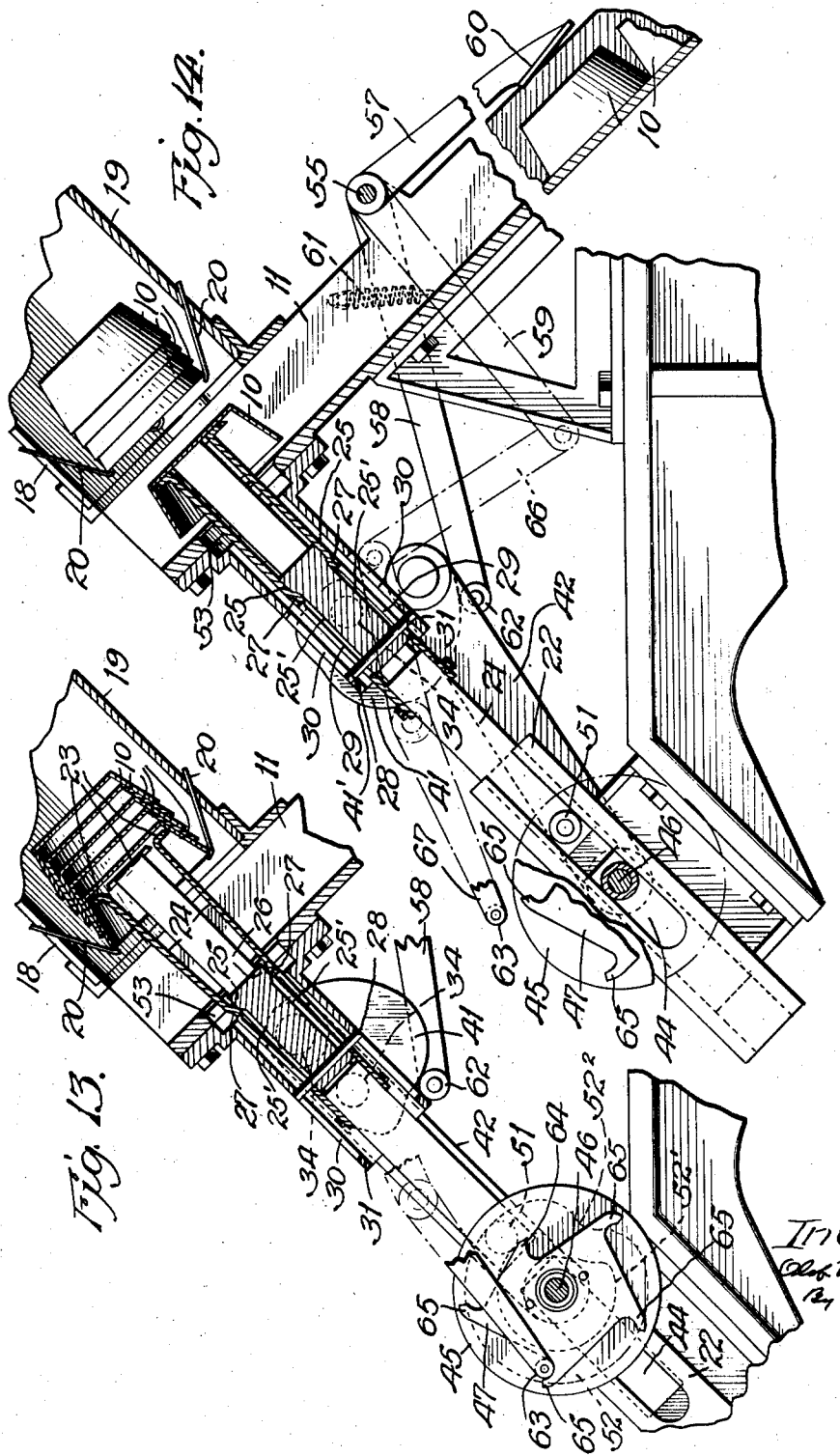

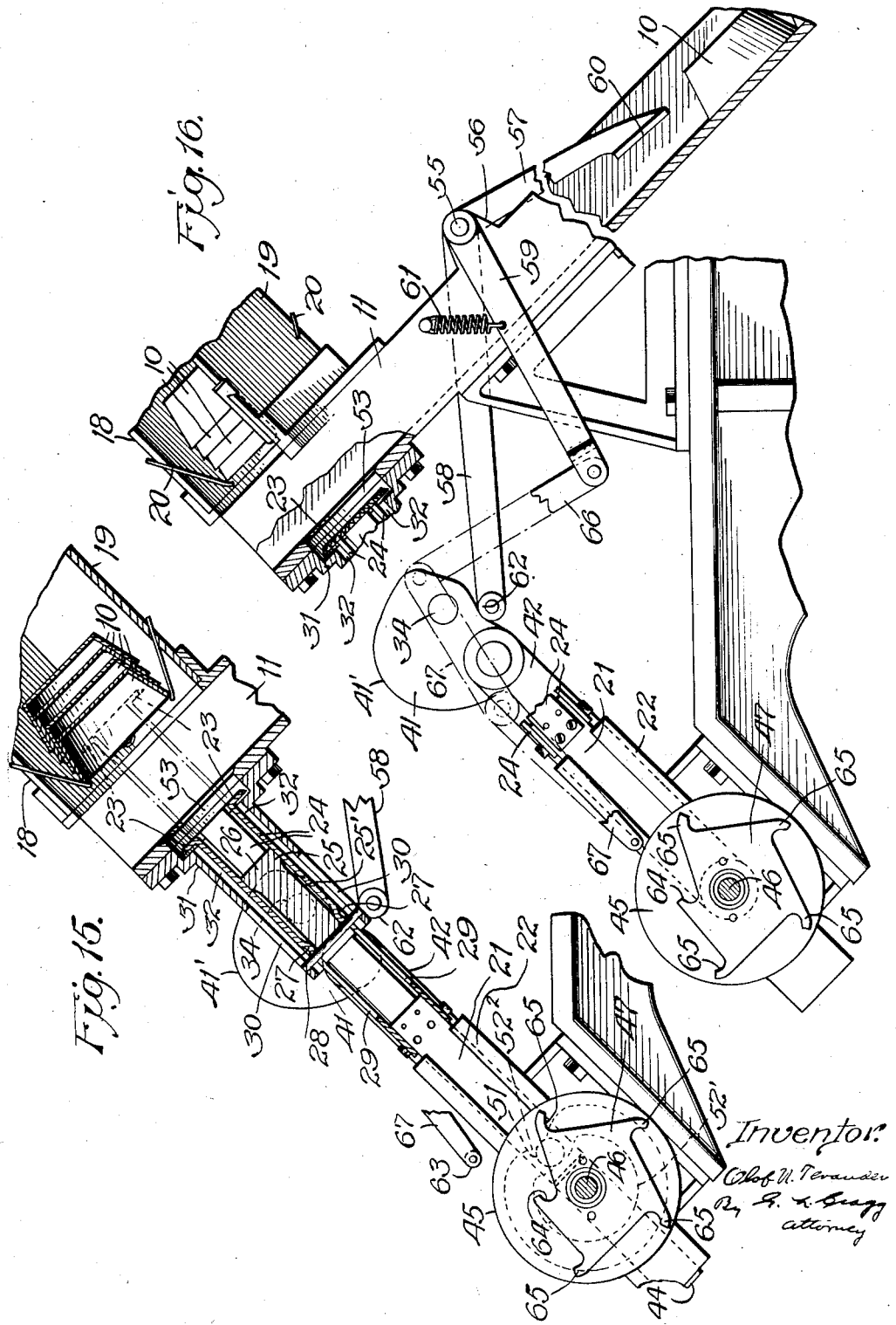

Patented May 9, 1933

1,907,900

UNITED STATES PATENT OFFICE

OLOF N. TEVANDER, OF CHICAGO, ILLINOIS, ASSIGNOR TO STANDARD CAP & SEAL CORPORATION, OF CHICAGO, ILLINOIS, A CORPORATION OF VIRGINIA

CONVEYING MECHANISM

Original application filed June 25, 1928, Serial No. 288,102. Divided and this application filed August 13, 1929. Serial No. 385,621. Renewed March 18, 1932.

This application is a division of my recent application Ser. No. 288,102, filed June 25, 1928.

My invention relates to conveying mechanism and has a number of objects and advantages, the mechanism of my invention being particularly useful when employed in conveying closure caps to the mouths of milk bottles, though the invention is not to be limited to any particular use to which it may be put. I have employed the conveying mechanism of my invention for conveying closure caps to a cap applying machine that is inclusive of a support for the bottles to be capped, and a positioner for the skirted caps that are to be applied to the bottles and serving to place the axis of each cap angular to the bottle that is to receive the same and with the cap interior abreast of the rim of the bottle mouth, said support and positioner directing relative movement of the bottle and cap while thus angularly related to enable the bottle to enter the cap and engage the cap to remove the cap from its position on the positioner and permit the cap to lodge upon and about the bottle mouth. The positioner for the skirted caps is located at the discharge end of a chute which is preferably inclined. This positioner is desirably inclusive of two ledges or shelves upon which the caps individually rest and which ledges are hinged upon the bottom of the chute. These ledges or shelves have upright wing portions rising from their outer longitudinal edges and between which the cap that is upon the shelves is gripped, these wing extensions thus constituting jaws. A spring connects the jaws to press them against the cap that is upon the aforesaid ledges or shelves to hold the cap with its axis angular and preferably inclined to the bottle that is next to receive the cap. A presser foot is employed which is positioned to press the cap downwardly after the mouth of the bottle has entered the cap, the presser foot and the bottle cooperating in dislodging the cap from the jaws and applying the cap to the bottle.

The conveyor of my invention is employed for directing a solid row of bottles toward the closure positioner whereby the bottles to the rear of the bottle which is about to have a closure applied thereto serve firmly to maintain such bottle in an upright position to enable this bottle to dislodge the closure from the closure positioner and locate such closure upon such bottle. To insure this result, a space intervenes between the discharge end of the conveyor and the closure positioner which is sufficient to contain a plurality of, say two, bottles. This space is bridged by a deck which extends from the discharge end of the conveyor to a point forwardly beyond the closure positioner and the presser foot that is located at the positioner. Due to the friction of the bottles upon the deck, a solid row of bottles of considerable length must be upon the deck and conveyor in order that the bottle next to be capped may have a cap applied thereto.

The invention has for another object the provision of means for governing the discharge of objects from a magazine to a chute, this feature of the invention being of particular service in connection with machines for applying caps to milk bottles and in which the milk bottles take part in placing the caps thereon.

The invention has for another object the provision of improved mechanism for withdrawing objects from the magazine and placing them in the chute, this feature of the invention being also of particular importance in connection with milk bottle capping machines.

The invention will be more fully explained by reference to the accompanying drawings in which Fig. 1 is a view of the preferred embodiment of the invention taken generally on line 1—1 of Fig. 2, on a larger scale, parts being broken away; Fig. 2 is a sectional view on line 2—2 of Fig. 1, parts being omitted; Fig. 3 is a sectional plan view taken on line 3—3 of Fig. 1, on a larger scale; Fig. 4 is a view taken on line 4—4 of Fig. 1, on a larger scale, parts being broken away, this view showing the jaws upon the positioner at the lower end of the chute in gripping relation to a cap which is in readiness to be entered by the mouth of a bottle; Fig. 5 illustrates a part of the structure shown in Fig. 4, the cap being illustrated as undergoing dislodgement from the jaws to the action of the bottle whose mouth is to receive this cap; Fig. 6 is a sectional view on line 6—6 of Fig. 3, on a larger scale, parts being broken away; Fig. 7 is a sectional view on line 7—7 of Fig. 6 on a larger scale; Fig. 8 is a sectional view on line 8—8 of Fig. 6; Fig. 9 is a sectional view on line 9—9 of Fig. 6 on a larger scale; Fig. 10 is a perspective view of a portion of a member which is designed to enter a magazine for withdrawing the closure caps and placing them in the chutes; Fig. 11 is a sectional view on line 11—11 of Fig. 6, on a larger scale; Fig. 12 is a sectional view on line 12—12 of Fig. 6, on a larger scale; and Figs. 13, 14, 15 and 16 illustrate a portion of the machine as shown in Fig. 6 with parts in changed positions.

The bottles 1 are placed upon a feeding conveyor, this conveyor being preferably the upper stretch of an endless horizontal belt 2 which is passed about pulleys 3 and 4, one of these pulleys, say the pulley 3, being a driving pulley, and the other an idler. A horizontal deck 5 underlies the upper stretch of this belt to maintain it level and to aid in supporting the bottles thereon. The belt discharges the bottles upon another horizontal deck 6 which is preferably long enough to support three bottles in alignment and fractions of other bottles. A horizontal discharge belt 7 has its upper stretch at the level of the deck 6 to receive bottles from this deck. Another horizontal deck 8 maintains the upper stretch of the deck 7 level. The decks 5, 6 and 8 together constitute the bottom of a chute whose side walls 9 are spaced apart a distance slightly in excess of the diameter of the bottles being fed so that the bottles are maintained in alignment to enable the rear bottles to push upon the bottles that are ahead whereby the particular bottle which is capping itself may be maintained upright and be sufficiently reinforced to perform this function.

The skirted closure caps, usually formed of flexible paper, are fed toward the bottles through a chute 11 which is preferably inclined. A positioner for these caps is located at the discharge end of the chute 11. This positioner is preferably inclusive of two ledges or shelves 12 upon which the caps individually rest and which ledges are hinged upon the bottom of the chute as indicated at 13. These ledges or shelves have upright wing portions 14 rising from their outer longitudinal edges and between which the cap 10 that is upon the shelves is gripped, these wing extensions thus constituting jaws. A spring 15 connects the jaws to press them against the cap that is upon the aforesaid ledges or shelves to hold the cap with its axis angular and preferably inclined to the bottle that is next to receive a cap. This particular bottle is illustrated as being above the mid portion of the deck 6 and with its mouth entered within the interior of the inclined cap that is upon the shelves 12. When the bottles are moved further forward from the position illustrated, the mouth of the bottle upon the middle of the deck 6 will engage some portion of the inclined bottle cap, such as the skirt of the cap, and force the removal of such cap from the jaws 14. As such cap is being thus removed, it will descend and lodge upon and about the mouth of the bottle that has engaged it.

To insure the full descent of such cap and its lodgement upon such bottle, I employ a presser foot 16 which is hinged upon the support 17 that is mounted upon the upper side of the chute 11. The free end of the presser foot extends forwardly of its mounted end and is positioned to engage each cap very shortly after such cap has been engaged and slightly moved by a bottle. The presser foot is so shaped as to exert turning effort upon the cap it engages in the same direction as the corresponding bottle tends to turn the cap, the presser foot and bottle thus cooperating in placing the cap fully down upon the bottle.

I provide a magazine from which the skirted closure caps are fed to the chute 11, this magazine being shown in the form of a generally rectangular casing having two diagonally opposite longitudinal edges 18, 19 in a vertical plane, one of the sides of the magazine adjacent the upper edge 18 being removed to permit the sidewise insertion of a stack of closure caps into the magazine. Strip metal spring fingers 20 are provided within the lower or discharge end of the magazine, the outer ends of these fingers being carried by the walls of the magazine and the inner or unmounted ends extending beneath the bottommost cap to hold this cap in readiness for removal to the chute 11. The magazine is desirably disposed at right angles to and above the rear end of said chute, the interiors of the magazine and chute being, of course, in register so that the caps may readily be passed from the magazine to the chute.

A plunger 21 is aligned with the magazine. The plunger is reciprocable within the guide 22, by mechanism to be hereinafter set forth. The guide extends along the axis of the magazine and maintains the axis of the plunger coincident with the axis of the magazine and with the axis of the stack of caps in the magazine. The plunger has an expansible and contractible head above its upper end, this head being inclusive of four flanged quadrants or segments 23 which are respectively provided upon the upper ends of strip metal springs 24 and preferably constituting integral continuations of such springs. The lower ends of these springs are screwed to the upper end of the plunger. The outer edges of the segments 23 are serrated so as to be adapted to have withdrawing engagement with and within the lowermost cap in the magazine when the plunger has been moved upwardly sufficiently to enter the head 23 in the cap. When the head 23 has been inserted within the lowermost cap, it is expanded into engagement with such cap by means of the cam formations 25 at the upper end of the cam block 26. This cam block is movable along the axis of the plunger 21 and with reference to said plunger by mechanism hereinafter set forth. The cam block is surrounded by the springs 24 and its cam formations 25 have spreading engagement with said springs to spread the head 23 into engagement with a cap when said cam formations are engaged with the humps 27 on the springs 24 as hereinafter set forth. When the cap has been thus engaged, the plunger 21 is lowered to bring the engaged cap into the chute whereafter the cam formations 25 and humps 27 are separated to permit the springs 24 to flex toward each other to contract the head 23 and free the cap and permit it to slide downwardly within the chute. The head 23 is movable through a hole in the bottom of the chute, the portion of the chute surrounding this hole serving as a means for stripping the cap from the head if the cap has been caught on the head.

A pin 28 passes through the lower end of the cam block 26 and also through elongated slots 29 that are formed in two opposite ones of the springs 24. This pin also enters the longitudinal slots 30 that are formed in the housing 31 and along which said pin moves as the block 26 travels. This housing surrounds the cam block 26 and the springs 24 and is provided with recesses 32 which receive said springs to guide them in their reciprocation, the recesses being sufficiently deep to permit said springs to be flexed throughout their working range. The corners of the block 26 enter the angular recesses 33 in the housing 31, those recesses guiding said block in its movements.

I will now describe the preferred form of mechanism for effecting the operation of the plunger 21 and cam block 26 and parts in association therewith. This mechanism is operated from the main shaft 34 which is driven by any suitable means such as an electric motor 35 whose shaft 36 is brought into driving relation with the shaft 34 through the intermediation of the coupling 37, the shaft 38, the worm 39 upon the latter shaft, and the worm wheel 40 which is fixed upon the shaft 34. The shaft 34 carries a crank 41 which also constitutes a cam functioning as such as will hereinafter appear. A pitman 42 couples the crank 41 with the enlarged end of the shaft 43 upon which shaft and the adjacent end of the pitman is journaled. The shaft 43 passes through and is in fixed connection with the upper end of the plunger 44 which is also directed by the guide 22. A cam 45 is provided with a bushing 46 that is journaled upon the shaft 43. A star shaped ratchet wheel 47 is fixed upon the cam 45 coaxially with the shaft 43. A nut 48 is screwed upon the adjacent end of the shaft 43 and serves to maintain a coiled spring 49 under compression. The spring presses upon a brake collar 50 which freely surrounds the shaft 43 and presses upon the adjacent faces of the cam 45 and wheel 47 whereby the elements 45 and 47 are yieldingly held in the positions to which they are turned by mechanism which will be described.

The plunger 21 carries a cam roller 51 which enters the cam groove 52 in the cam 45. Said plunger 21 is reciprocated by the crank 41 operating through the pitman 42, the shaft 43, the cam 45 and the cam roller 51 while the ratchet wheel 47 and cam 45 are initially held in fixed relation with the shaft 43 by the spring 49 and the brake collar 50. The range of reciprocable movement of the plunger is governed by the cam 45 and the cam roller 51. This cam is turned by mechanism to be later set forth so as to engage the cam roller 51 with the cam bulge 52' when the plunger is to have an effective range of movement to bring the expansible and contractible head 23 into withdrawing engagement with the lowermost cap in the magazine. Said cam 45 is turned by said mechanism so as to engage the cam roller 51 with the cam depression 52² in order to lower the range of movement of the plunger to prevent said head from having withdrawing engagement with the lowermost cap in the magazine.

The block 26 initially moves upwardly with the plunger 21 due to the pressure of the springs 24 against the sides of the block. The upward movement of said block 26 continues until the pin 28 strikes the upper ends of the slots 30, the plunger 21 continuing in its upward movement after the engagement of the pin 28 with such slot ends to bring the head 23 within the lowermost cap in the magazine. The humps 27 upon the springs 24 are not brought into engagement with the cam formations 25 until the plunger 21 has moved upwardly a considerable distance after the block 26 has been arrested, the engagement of the humps 27 with the cam formations 25 being thus delayed until the head 23 has been properly inserted within the lowermost cap in the magazine. The head is expanded into engagement with the lowermost cap consequent upon the engagement of the humps 27 with the cam formations 25 as hereinbefore described and as illustrated in Fig. 13. When the head has been thus expanded, the plunger 21 will be lowered by the operation of the crank 41 to dislodge the lowermost cap from the magazine and place it into the position shown in Fig. 14 whereupon the head 23 is contracted to release the cap before the cap reaches the bottom of the chute 11 and before the plunger 21 has completed its return movement so that the head, being thus timely contracted, will not tear the cap in the further downward movement of the head. The block 26 initially moves downwardly with the plunger 21 due to the pressure of the humps 27 upon the block, such movement of the block with the plunger continuing until the pin 28 strikes the lower ends of the slots 30. When the pin 28 engages the lower ends of the slots 30, the block 26 is arrested to permit the humps 27 to move away from the cam formations 25 to permit the springs 24 to approach, due to their own resilience, such approach occurring when the parts reach the position illustrated in Fig. 14 to enable the contractions of the head 23 before the engaged cap reaches the bottom or floor of the chute and for the purpose hitherto set forth. If the cap should accidentally be caught upon the contracted head, it will be readily stripped therefrom when the cap is brought against the bottom of the chute by the receding head.

As the plunger 21 continues its downward movement, it draws the contracted head 23 into the opening 53 in the bottom of the chute, Fig. 6. The operating range of travel of the head 23 is, therefore, between the position which this head occupies as illustrated in Fig. 6 and the position which is illustrated in Fig. 13. The head continues in this range of movement to effect the discharge of four caps from the magazine. After four caps have been discharged from the magazine, the range of movement of the head is altered to terminate shorter, at its upper end, than the feeding range of movement of the head to omit the feeding of one cap during one cycle of movement of the head. When this range of movement of the head is thus lowered to terminate sufficiently short of the magazine to prevent the head from having cap engageable position, the head is preferably not expanded at the upper limit of its travel. The invention is not to be limited to this characteristic although I claim such characteristic as being novel. The expansion of the head is then avoided because the cam formations 25 upon the block 26 do not reach the humps 27 during the elevation of the plunger, the head being thereby further prevented from having withdrawing engagement with the lowermost cap in the magazine.

I will now describe the preferred form of mechanism whereby the range of movement of the head is caused to terminate sufficiently short of the magazine to prevent it from engaging a cap and whereby the head is prevented from expanding each time the transfer of a cap from the magazine to the chute is to be prevented. I employ a bell crank which is inclusive of a shaft 55 suitably journaled in bearings 56, an arm 57 fixed upon said shaft, and two other arms 58 and 59 which are also fixed upon said shaft. The arm 57 terminates in a presser foot 60. A spring 61 acts upon the bell crank structure 55, 57, 58, 59 to move the same, when permitted, in a clockwise direction. The presser foot 60 enters the chute 11, the range of movement of the bell crank structure being such as to permit the foot to rise above the path of movement of the caps in the chute and to enter said path. The arm 59 is connected by the link 66 with the intermediately pivoted arm 67 that carries the roller 63. This roller is placed in or out of the path of the teeth 65 according to the position of the presser foot 60, the position of this presser foot being governed by the caps 10 in the chute and the spring 61.

The crank 41 which is also a cam, as hitherto set forth, may then have some such position as illustrated in Fig. 16 in which the cam roller 62 upon the outer end of the ball crank arm 58 is brought within the depressed portion of the cam by the action of the spring 61, said cam 41 then permitting the presser foot 60 to enter the path of movement of the caps in the chute 11. As the cam 41 turns in a clockwise direction, the roller 62 will gradually ride onto the bulging portion 41' of the cam whereby the bell crank structure is turned in a counterclockwise direction against the spring 61 to lift the presser foot 60 out of the path of the caps in the chute to permit the caps to pass beneath the presser foot.

Let it be assumed that the parts are in the position illustrated in Fig. 16 when the bottle capping operation is initiated and that no caps are initially in the chute. In this position roller 63 is in the path of reciprocable movement of the short or irregular tooth 64, so that the star wheel 47 is turned to bring the cam bulge 52' into engagement with roller 51 to raise the range of travel of plunger 21 to enable the head 23 thereon to successively discharge four caps from the magazine into the chute. The conveyor 2 is started after these four caps are accumulated in the chute. These four caps are accumulated in the chute while the bottles are not traveling because the first cap that is fed into the chute is caught and retained by the jaws 14 and thereby retains the three following caps. During the feeding of the first three caps into the chute, the presser foot 60 moves into and out of the path of the descending caps due to the coaction of the cam 41 and the roller 62. When the fourth cap has been received in the chute and is arrested beneath the presser foot 60 by the first three caps, the range of movement of the presser foot is reduced thereby. The fourth cap serves to lift the cam roller 62 partially out of the depression in the cam 41 but not sufficiently to prevent this cam roller from riding upon the cam bulge 41′ just as this cam bulge reaches the roller. When the presser foot 60 is thus engaged and held by the fourth cap, this cap places the bell crank structure in a position to lift the cam roller 63 out of the range of reciprocable movement of the irregular or short tooth 64 which has been brought to its initial position upon the feeding of four caps to the chute to bring the cam depression $52^2$ into engagement with roller 51 to lower the range of movement of head 23 to prevent it from functioning. The bottle conveying belt 2 is started when the fourth cap is beneath the presser foot 60. The first cap that is fed into the chute is withdrawn by the bottle that engages it, permitting the following caps to pass downwardly a cap space. When the presser foot 60 enters the path of the caps following the removal of the first cap by a bottle and during an idling operation of head 23 in its lower range, the roller 63 is brought into the path of reciprocable movement of the tooth 64 so that the ratchet wheel 47 in moving bodily upward turns cam bulge $52^1$ into engagement with roller 51 to raise the range of operation of head 23 to permit the head to function. The upper right hand tooth 65 is consequently placed in radial alignment with the initial position of the tooth 64. The presser foot 60 is thereafter lifted out of the path of the caps by the cam bulge 41′ to bring the roller 63 into the path of reciprocable movement of the then left hand tooth 65 so that on the next upward bodily movement of the wheel 47, said wheel will be turned one tooth space during the feeding of the fifth cap from the magazine to the chute. The sixth, seventh and eighth caps are fed during the time the parts 52′ and 51 are engaged. The ratchet wheel 47 thus requires five steps to complete each of its rotations, each one of four of its steps being accompanied by the feeding of a cap from the magazine to the chute, there being no feeding of a cap from the magazine to the chute during the fifth step movement of the ratchet wheel.

It is obvious that the machine may be started into operation when its parts are in other position than illustrated in Fig. 16, and that the cap and bottle feeding mechanisms may be started at the same time or the bottle feeding mechanism may be started before the cap feeding mechanism. By means of the cap feeding structure described, the caps cannot be clogged in the chute if the feeding of the bottles should stop or the rate of feeding thereof be unduly reduced or become irregular. This is of particular importance since it has been found desirable to provide one prime mover for the cap feeding mechanism and another prime mover, uncoupled with the first, for the bottle feeding mechanism. After the caps have been placed upon the bottles, fastening bands are usually applied about the cap skirts to hold the caps in place.

Changes may be made without departing from the invention.

Having thus described my invention, I claim:

1. The combination with a magazine for objects; of a reciprocable object withdrawing member having an expansible and contractible head which is movable into position to engage the object next to be delivered from said magazine; mechanism enabling the expansion and contraction of said head and into one of these adjustments to engage said object when said member is advanced to such object and into the other adjustment when such head and object are withdrawn from the magazine to release such object; and mechanism for moving said reciprocable member in one range to bring said head into engageable position with the object next to be delivered from the magazine and in another range which terminates sufficiently short of the magazine to prevent said head from reaching such engageable position.

2. The combination with a magazine; of an object withdrawing member; and mechanism for moving said member in one range to bring it into extracting engagement with an object in said magazine and in another range of operation which terminates sufficiently short of the magazine to prevent said member from having such extracting engagement.

3. The combination with a chute; of a magazine for containing objects to be delivered to and discharging into said chute; a reciprocable member for withdrawing objects from said magazine; a cam operable upon said reciprocable member to vary the extent of its approach to the magazine to prevent or permit it to have withdrawing engagement with the object next to be discharged; a ratchet wheel operating upon said cam to cause it to change the extent of approach of the object withdrawing member to the magazine, said ratchet wheel having a tooth which is irregular with respect to the remaining teeth; mechanism for reciprocating said reciprocating member and ratchet wheel and having a cam coupled therewith; and mechanism having an element engageable with the ratchet wheel teeth when this wheel is bodily moved to turn the wheel and also a second element adapted for movement into and out of the path of objects in the chute, such movement being enabled by the latter cam, said second element being held by objects in the chute stopped in succession in engagement therewith, said cam permitting said first element to be in the path of reciprocable movement of the aforesaid irregular ratchet tooth when there is no delivered object beneath the second aforesaid element.

4. The structure of claim 3 wherein the element that is movable into and out of the path of objects moving in the chute is in the form of a presser foot adapted to rest upon objects stopped successively beneath it to reduce its range of movement.

5. The combination of a mechanism for objects; of an object withdrawing mechanism including a reciprocable member having means for directing it in its movements; a cam operable upon said reciprocable member to vary the extent of its movement; a reciprocable ratchet wheel operating upon said cam to cause it to change the extent of movement of said reciprocable member, said ratchet wheel having a tooth which is irregular with respect to the remaining teeth; and a member adjustable into the paths of reciprocable movements of the various ratchet wheel teeth to vary the extent of movement of the aforesaid reciprocable member to render the same selectively operable to withdraw objects from said mechanism.

6. The combination with a chute; of a magazine for containing objects to be delivered to and discharging into said chute; mechanism forcing delivery of objects from the magazine to the chute; and means governing said mechanism and engageable and operable by objects in the chute and operating upon said mechanism when engaged by an object in the chute to prevent said mechanism from functioning to avoid delivery from the magazine and when unengaged by an object in the chute operating upon said mechanism to permit said mechanism to force delivery from the magazine, wherein the mechanism is inclusive of a plunger having an expansible and contractible head that is movable into withdrawing engagement with the object that is in deliverable position in the magazine and serving to carry such object into the chute, and means enabling the expansion of said head into withdrawing engagement with the object to be delivered and enabling the contraction of said head to free such object, when withdrawn from the magazine.

7. The combination with a magazine for hollow objects; of an object withdrawing member having an expansible and contractible head which is movable into the hollow object next to be delivered from said magazine; mechanism enabling the expansion of said head into withdrawing engagement with said object when said member is advanced to such object and enabling the contraction of said head when such head and object are withdrawn from the magazine to release such object; and mechanism for moving the withdrawing member in one range to bring the head into engageable position with the object next to be delivered from the magazine and in another range which terminates sufficiently short of the magazine to prevent said head from reaching such engageable position.

8. The combination with a magazine for objects; of an object withdrawing member having an expansible and contractible head which is movable into position to engage the object next to be delivered from said magazine; mechanism enabling the expansion and contraction of said head and into one of these adjustments to engage said object when said member is advanced to such object and into the other adjustment when such head and object are withdrawn from the magazine to release such object; and mechanism for moving the withdrawing member in one range to bring the head into engageable position with the object next to be delivered from the magazine and in another range which terminates sufficiently short of the magazine to prevent said head from reaching such engageable position.

9. In combination with a magazine, a chute; a cover withdrawing member; means for delivering covers to said chute including mechanism for moving said member in one range to bring it into extracting engagement with a cover in said magazine and in another range of operation which terminates sufficiently short of the magazine to prevent said member from having such extracting engagement and means actuated by a cover in said chute for controlling said mechanism.

10. In a mechanism for applying covers to objects, the combination of means for supplying covers adjacent said objects, said means including a magazine for said covers, a cover withdrawing member, means for moving said member in one range to bring it into extracting engagement with a cover in said magazine and in another range of operation which terminates sufficiently short of the magazine to prevent said member from having such extracting engagement, means for conveying said covers to applying position; means for supplying objects to cover applying position to remove covers from said conveying means; and means beyond said applying position to adjust said cover relative to said object.

11. In a mechanism for applying covers to objects, the combination of means for supplying covers to a position adjacent said objects, said means including a magazine for said covers, a cover withdrawing member, means for moving said member in one range to bring it into extracting engagement with a cover in said magazine and in another range of operation which terminates sufficiently short to prevent said member from having such extracting engagement; means for conveying said covers to applying position; means for supplying objects to cover applying position; means actuated by said objects for releasing a cover from said conveying means; and means beyond said applying position to adjust said cover relative to said object.

12. In a mechanism for applying covers to objects, the combination of means for supplying covers to adjacent said objects, said means including a magazine for a supply of covers, a cover withdrawing member, means for moving said member in one range to bring it into extracting engagement with a cover in said supply and in another range of operation which terminates sufficiently short of the supply to prevent said member from having such extracting engagement, a chute for successively feeding said covers to applying position; means for supplying objects to cover receiving position; means actuated by said objects for releasing a cover from said chute; and means at the termination of said chute to adjust said cover on said object.

13. In a mechanism for applying closures to containers, the combination of a magazine for holding a supply of closures; means for withdrawing a closure from said magazine including mechanism for moving an extracting member in one range to engage a closure in said magazine and in another range of operation which prevents such extracting engagement; means for delivering a closure to applying position; means for feeding containers to applying position; and means actuated by said containers for releasing closures from the applying position including a closure positioner adjacent said applying position and rendered effective by said containers.

14. In a mechanism for applying closures to containers, the combination of a magazine for holding a supply of closures; means for withdrawing a closure from said magazine including mechanism for moving an extracting member in one range to engage a closure in said magazine and in another range of operation which prevents such extracting engagement; means including a chute for delivering a closure to applying position; means actuated by a closure in said chute for controlling said withdrawing means; means for feeding containers to and beyond applying position; and means actuated by said containers for releasing closures from said chute including a closure positioner adjacent said applying position and rendered effective by said containers.

In witness whereof, I hereunto subscribe my name.

OLOF N. TEVANDER.